United States Patent [19]
Stencel

[11] 3,792,933
[45] Feb. 19, 1974

[54] HIGH-STRENGTH FASTENING SYSTEM

[75] Inventor: Edgar L. Stencel, Huntington Beach, Calif.

[73] Assignee: VSI Corporation, Pasadena, Calif.

[22] Filed: Dec. 20, 1971

[21] Appl. No.: 209,603

[52] U.S. Cl................ 403/19, 403/40, 403/408, 85/7, 29/446, 72/391
[51] Int. Cl............................................. F16b 7/00
[58] Field of Search ........ 85/7, 32 R; 287/189.36 F; 29/526, 446, 520; 403/19, 40, 408; 72/391

[56] References Cited
UNITED STATES PATENTS

| | | | |
|---|---|---|---|
| 3,641,865 | 2/1972 | Swindt | 85/7 |
| 3,215,024 | 11/1965 | Brilmyer | 85/7 |
| 3,203,300 | 8/1965 | Marschner | 85/7 |
| 3,371,572 | 3/1968 | King, Jr. | 85/7 |
| 3,464,306 | 9/1969 | Reynolds et al. | 85/7 |

*Primary Examiner*—Richard J. Herbst
*Attorney, Agent, or Firm*—Robert M. Ashen

[57] ABSTRACT

A fastening system comprising a pin with a head and a shank, the shank fitting within mating holes of a plurality of sheets or other members to be joined together, said head being positioned adjacent one of said sheets, said shank including a grooved portion extending from the sheets opposite said head. A female member is clamped about said grooved portion of said pin to join the sheets together, the female member including a malleable ductile collar initially positioned about the grooved portion of the pin and an outer sleeve of material no more ductile than said collar and having an inner diameter less than the initial outer diameter of said collar. The sleeve is initially positioned adjacent the outer end of the collar. The outer surface of the collar and the interior surface of the sleeve may include a lubricant coating. A tool is used to apply an axial force on the sleeve to move the sleeve axially along the collar toward the sheets. The sleeve thereby swages the collar radially inwardly about the grooved portion of the pin, with the sleeve remaining in a set position retaining the collar about the pin after the tool has been removed.

13 Claims, 9 Drawing Figures

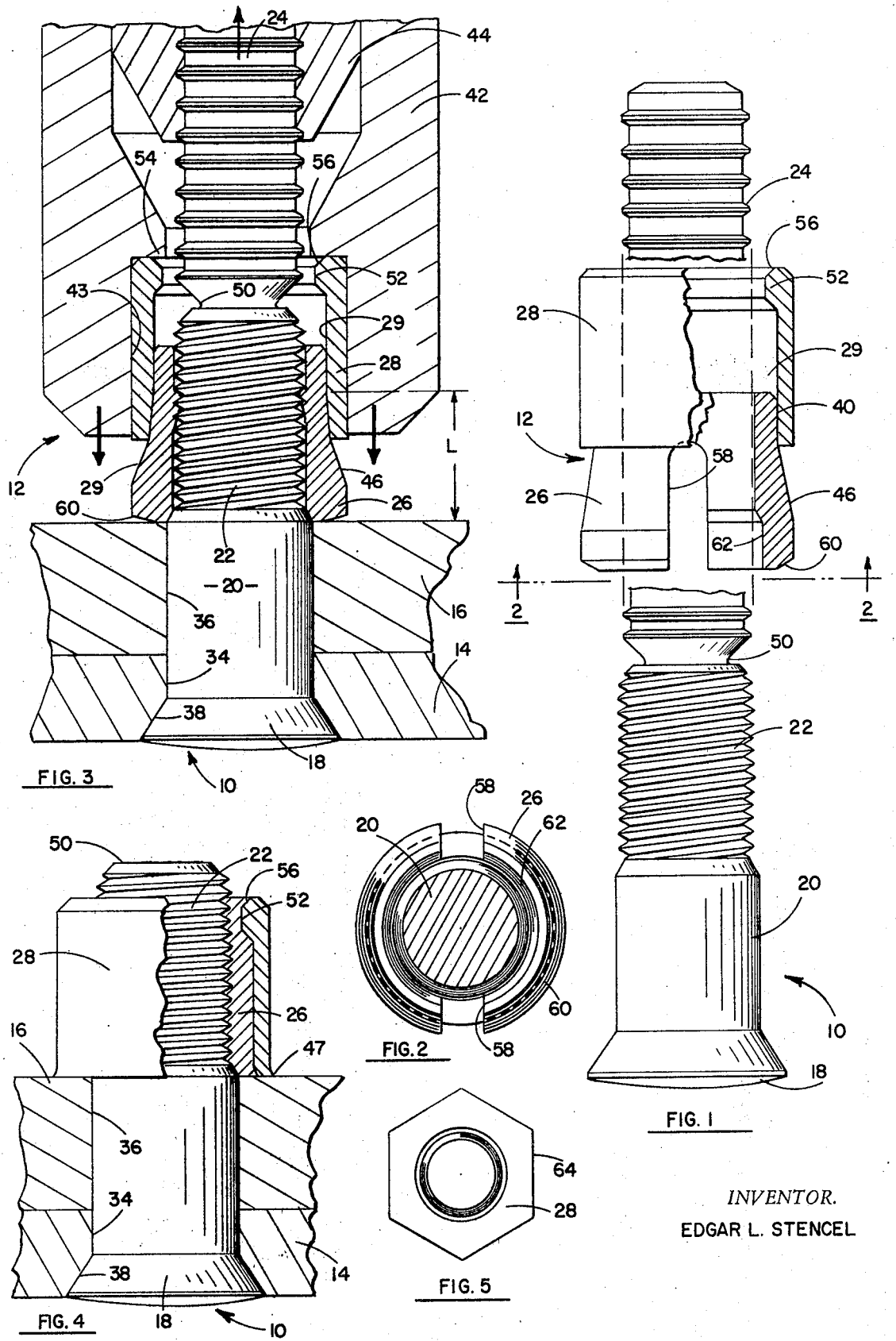

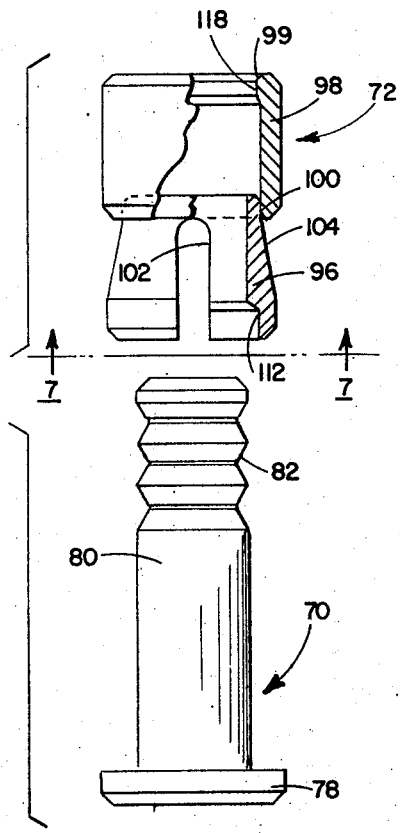
FIG. 6
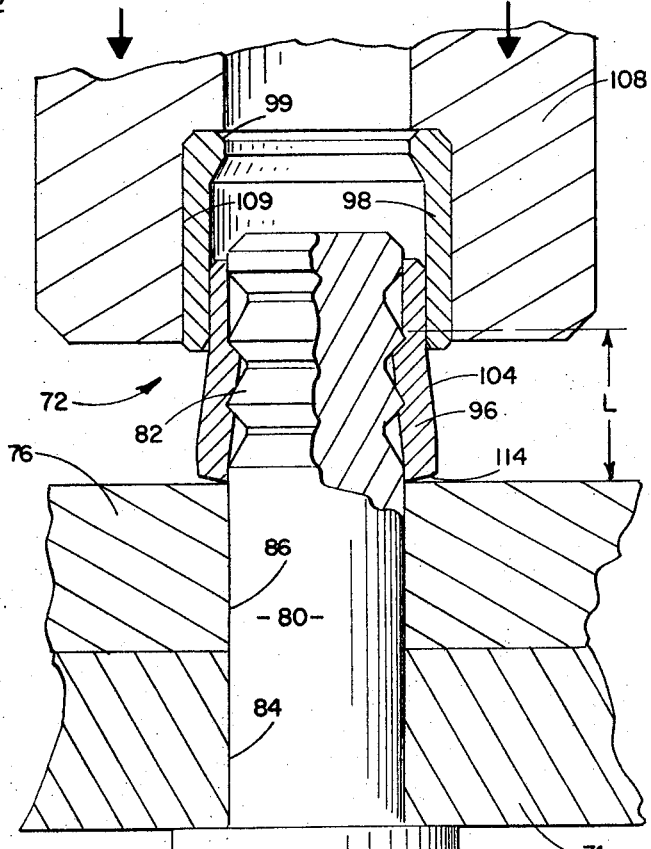
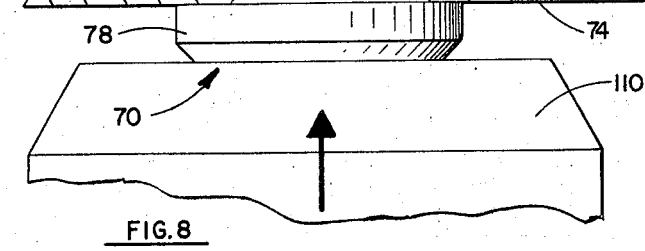
FIG. 8
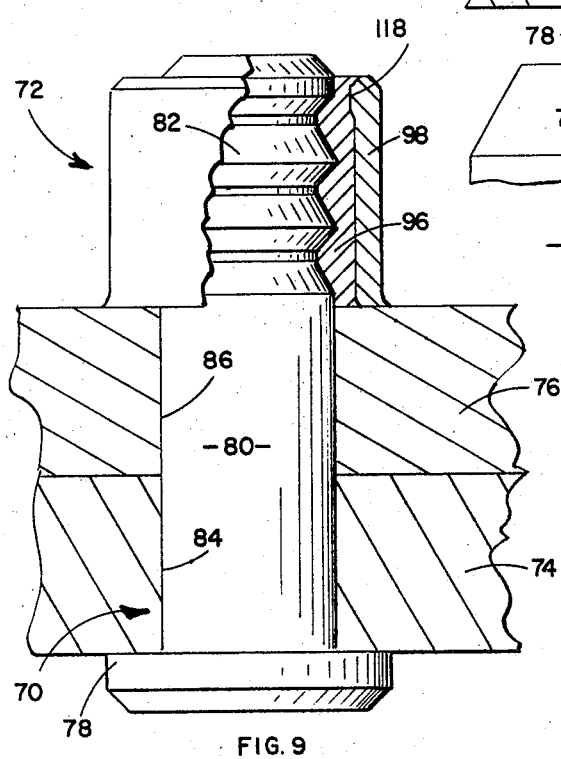
FIG. 9
FIG. 7
INVENTOR.
EDGAR L. STENCEL

HIGH-STRENGTH FASTENING SYSTEM

BACKGROUND OF THE INVENTION

This invention is in the field of fastening systems, and more particularly fastening systems for securing a plurality of sheets together so as to apply a preload or clamp-up force on the system and to the sheets.

There are currently various forms of such devices. Many of these existing devices utilize the swaging of a malleable collar to a pin or bolt. Typically, a malleable collar is swaged by a tool to the threaded or grooved portion of a bolt, and the tool is then removed. The bolt or pin has a head that seats adjacent one side of the sheets to be drawn together and the preload or clamp-up force is applied as the collar is being swaged to the pin. This is achieved either by a pulling force directly applied to the pin or by forces generated by the swaging action itself, either or both of which means produce axial loading forces on the pin. When the tool, or tools, which have applied the swaging and pull forces, are removed, the collar, due to its inherent resiliency, will dilate or return somewhat to its original shape, thereby lessening the applied preload to the system and the clamp-up force on the sheets.

Other forms of current fastening systems utilize a somewhat similar method by swaging a malleable outer collar onto and about an inner, harder sleeve which sleeve forms grooves or cuts into the pin or bolt shank. In these systems the beneficial resulting axial force on the pin due to the swaging action may not be present and, as with the above-mentioned systems, when the tool is removed the collar will return or dilate reducing the crimping or clamping effect on the inner sleeve.

Other current systems employ various forms of lock nuts where an outer member is rotated or turned about an inner member to cam or bend portions of the inner member into locking engagement with the threads of a bolt or pin. There is no swaging or material flow of the inner member and, therefore, no resulting axial preloading effect resulting from the locking action. Further, the crimping-type forces are produced by the torquing or turning of the outer member and are, therefore, not applied axially and directly radially inwardly but are applied obliquely because of the turning-type wedging action.

SUMMARY OF THE INVENTION

The invention herein comprises a fastening system for joining a plurality of sheets together having mating holes therethrough. The system comprises a pin with a head positioned abutting one of the sheets and a shank which is fitted within the mating holes. A grooved portion of the shank extends outwardly of the sheets opposite to the head. The grooved portion may include threads, annular grooves, or slots, or any similar configuration, and, accordingly, when the term "grooved" is used herein it is intended to mean any of such configurations. A two-piece female member is swaged about the grooved portion of the pin to set the fastener in its preloaded locked position. The female member includes a malleable, ductile collar which is initially positioned adjacent the sheets and about the grooved portion of the pin, and an outer sleeve of material no more ductile than the collar and with an inner diameter less than the initial outer diameter of the collar. The sleeve is initially positioned proximate the outer end of the collar away from the sheets and a lubricant may be applied to the outer surface of the collar and the interior surface of the sleeve. Forces are applied to the sleeve in an axial direction toward the sheets, while the sleeve is restrained from outward radial movement, moving the sleeve axially along the collar to swage the collar radially inwardly about the grooved portion of the pin. The swaging action on the collar compresses and cold works the material of the collar producing resulting axial forces in the collar acting along the pin which produce the preload on the system and the clamp-up force on the sheets. In a preferred embodiment the outer surface of the collar slopes outwardly in a frusto conical shape and the length of this surface of the collar is longer than the corresponding axial distance to the sheets. As the sleeve moves toward the sheets, the collar material is rotated inwardly into a smaller area producing compressive forces in the collar material which in turn react against the pin and sheets to assist in producing the preload and clamp up. A counteractive force is simultaneously applied to the pin to resist the axial force applied to the sleeve. A tool provides the axial force on the sleeve and also confines or retains the sleeve, whereas the sleeve itself applies the actual swaging forces on the collar. The sleeve itself is not deformed or swaged along the major portion of its length and is adapted to remain in the final set position of the system when the tool and external applied forces are removed. The sleeve, therefore, retains the swaged collar in substantially its fully preloaded position and prevents the return or dilation of the collar as with the aforementioned existing prior art systems. The full preload and clamp-up applied to the system is, therefore, maintained even after the tool has been removed. An important feature of the invention is, therefore, that it is the outer element of the female member which itself applies the swaging force to the malleable inner collar element (rather than the tool applying such force), and that this outer element remains in the set assembled position to maintain substantially the full preload applied to the system.

It is important that the sleeve be of material no more ductile than the collar so that the sleeve can itself swage the collar about the grooved portion of the pin. The more ductile the collar, the easier this function is accomplished. If the collar and sleeve are of the same ductility, it is normally essential that a lubricant coating be applied to the adjacently sliding surfaces of these members to assist in effecting the desired swaging function, with the additional outward radial restraint provided by the tool. If the sleeve is of sufficiently stronger material than the collar, the swaging may be accomplished without a lubricant.

It is believed that the invention will be better understood from the following detailed description and drawings in which:

BRIEF DESCRIPTION OF THE DRAWINGS

FIG. 1 is an elevational, part sectional, part cut away view of a pull-type pin and female member of one embodiment of the invention.

FIG. 2 is a view along the line 2—2 in FIG. 1.

FIG. 3 is an elevational, sectional view of the pin and female member of FIG. 1 as positioned within the sheets to be joined and as tool members are applying forces thereto.

FIG. 4 is an elevational, part sectional view of the fastener system of this embodiment in its final set position.

FIG. 5 is a top view of the set sleeve member of another embodiment showing wrenching configurations thereupon.

FIG. 6 is an elevational part sectional preassembly view of the pin and female member of another embodiment of the invention.

FIG. 7 is a view taken along the line 7—7 in FIG. 6.

FIG. 8 is the pin and female member of FIG. 6 positioned in the sheets as a tool member commences to apply an axial force thereto.

FIG. 9 is the fastener system of this embodiment in its final assembled position.

DESCRIPTION OF THE PREFERRED EMBODIMENTS

FIGS. 1 through 4 show one of the preferred embodiments of the invention where a pin 10 and female member 12 are adapted to be clamped together to join two sheets or plates 14 and 16 in clamped relationship. The pin or bolt member 10 includes a head 18, a shank 20, and a grooved portion 22 as part of the shank 20. The grooved portion 22 is shown as a threaded portion; however, any type of threading or annular grooves or slots would be suitable. An annularly grooved pin tail portion 24 extends axially outwardly of the threaded or grooved portion 22 of the shank 20. The female member 12 includes a malleable, ductile inner collar member 26 and an outer sleeve member 28 formed of a material no more ductile than the collar member 26. The pin 10 and female member 12 are adapted to be secured together to apply a preload and a clamp-up force to join the sheets 14 and 16 in the final set assembly.

The shank 20 of the pin 10 is adapted to fit within mating holes 34 and 36 of the sheets 14 and 16, and as indicated, the head 18 may be of the flush-head variety to fit within a mating, countersunk portion 38 in the sheet 14. The threaded portion 22 of the shank 20 extends beyond the sheets 14 and 16 opposite the head 18 as indicated in FIG. 3.

The female member 12 may be preassembled as indicated in FIG. 1 by press fitting the sleeve member 28 about an outer portion 40 of the outer end of the collar 26, or the female member 12 may be assembled or formed from one piece which is a more expensive method, and accordingly, the best and least-expensive way is to form the female member in two separate parts and preassemble them together as indicated by the press fit in the area 40 of the collar. Where the ductility of the sleeve 28 is the same or only slightly less than that of the collar 26, a lubricant coating 29 is applied to the outer surface of the collar 26 and the interior, preferably cylindrical, surface of the sleeve 28 (for example a lubricant such as cetyl alcohol which is applied wet but which dries to form a dry lubricant coating).

The collar 26 is then positioned adjacent the sheet 16 and about the threaded portion 22 of the pin 10. An anvil tool member 42 is then positioned about the sleeve 28 and a pull tool member 44 is positioned to grip the pin tail portion 24 of the pin 10. The anvil tool 42 then applies an axial force against the end of the sleeve 28 in a direction toward the sheets as indicated by the arrows in FIG. 3, while at the same time the pull tool 44 pulls in an opposite direction applying a counter-active force to the pin 10 as indicated by the arrow. Because of the axial forces on the system, and particularly on the sleeve 28, the sleeve 28 will move axially toward the sheet 16, and as it does so, it will swage the collar 26 radially inwardly to cold form it about the threaded or grooved portion 22 of the pin 10. The tool 42 includes an interior cylindrical surface 43 which is positioned adjacent the outer surface of the sleeve 28 to restrain the sleeve from radial outward movement. The lubricant coating 29 permits the relative sliding movement between the adjacent surfaces of the sleeve 28 and the collar 26 which relative movement of the members produces the swaging of the collar 26 by sleeve 28 due to the initial difference in relative diameters even where both members are of the same or closely the same ductility, with the assistance of the restraining surface 43 of the tool 42 against the sleeve 28.

As indicated, the collar 26 has an inclined conical portion 46 which slopes gradually outwardly toward the end of the collar adjacent the sheet 16. Because of this conically protruding portion 46, as the sleeve 28 moves axially along the collar, the material of the collar will in effect be rotated inwardly toward the threaded or grooved portion 22 of the pin 10. Preferably, the length of this outer surface 46 of the collar 26 is greater than the axial length between the commencement of this outer surface 46 and the face of the sheet 16, so that as the collar is rotated inwardly it is wedged into an area of lesser length, creating axial preload on the system. Principally, however, the volume of the area into which the collar material 26 is rotated and swaged is, in effect, less than the volume of the collar material 26. As the sleeve approaches the sheet 16 and as the collar 26 is rotated inwardly and swaged, therefore, compressive forces are created in the collar material which impart axial forces on the pin 10 and against the sheets. The pin is thereby preloaded, in tension, outwardly, while clamp-up forces are applied on the sheets. The collar material is in effect cold worked or work hardened by the swaging operation. In fact, the actual preload force produced on the system is somewhat greater than the axial force applied to the sleeve 28 by the tool 42. The angle of the inclined conical portion 46 not only creates the rotation of the collar material 26 but may also have the effect of producing some initial clamp up on the sheets before any swaging of the collar occurs, in that some axial force must be generated on the sleeve before the sleeve will move down over the sloping face of the collar. This initial amount of axial force is transmitted through the system to become an initial clamp-up force on the sheets, assuring, therefore, some initial preloading and clamp up on the system.

As the sleeve 28 seats adjacent the sheets 16 and with sufficient pull forces applied to the pin tail 24, the pin tail will break away from the remainder of the pin shank 20 at a break-off groove 50 formed in the area between the pin tail 24 and the threaded or grooved portion 22 of the pin 10.

The final assembly is indicated in FIG. 4 after the tools 42 and 44 have been removed. Although the sleeve has caused the frusto conical skirt of the collar to both rotate and be swaged radially inwardly about the threads of the portion 22 of the pin 10, the sleeve 28 itself has not been swaged or deformed in any substantial respect except for perhaps a very small portion 47 at its end adjacent the sheet 16 due to the very high pressures created in that area because of the excess collar material 26. As shown, the sleeve 28 includes an inwardly projecting shoulder portion 52 which swages the outer end portion of the collar 26 into the threaded portion 22 of the pin to insure that the entire collar 26 is swaged radially inwardly about the pin 10 so that there are no gaps or open areas between the collar and the threads or grooves of the pin.

As shown in FIG. 3, the anvil tool 42 may include an annular inwardly projecting lip element 54, and the sleeve member 28 preferably has at its outer end a beveled interior surface 56. As the sleeve 28 reaches its final position adjacent the sheet 16, the projection 54 will force some of the material of the collar 26 over the beveled portion 56 of the sleeve 28 to thereby effectively lock the sleeve 28 in the set position. Another method of performing this type of locking function, not shown, would be to form the collar 26 of a slightly longer axial length than the sleeve 28 to thereby deform a portion of the collar over the end of the sleeve.

Because the sleeve 28 has not been swaged or deformed in any significant respect, the sleeve 28 in its final set position will retain or contain the swaged collar 26 in its final swaged configuration and will not permit the material of the collar 26 to return or dilate because of its inherent resiliency to thereby reduce any preload or clamp-up on the system. The sleeve 28, therefore, by being retained as part of the set fastening system thereby maintains the entire preload on the system after the tools 42 and 44 have been removed.

The tool 42 is formed to confine or create a restraining surface 43 for the sleeve 28 and applies the axial force to the sleeve 28, but it is the sleeve 28 and not the tool that actually applies the crimping or swaging forces to the inner collar 26. The tool 42 in this sense, then, is merely passive and is not the member that does the swaging of the collar 26.

This fastening system additionally may permit the use of very high-strength materials for the collar 26, however, with greatly reduced resulting hoop-stress forces in the collar which would create cracking or failure of the collar. This is due to the initial configuration of the collar which includes relief slots 58 as indicated in FIG. 2. As the collar 26 is swaged and rotated inwardly, these slots permit the collar to contract radially without creating excessive resulting hoop stresses in the collar material. Additionally, the forces applied on the collar 26 by the sleeve 28 are axial forces that are applied principally along the conical surface 46 to rotate the collar material in effect inwardly, which is preferable to swaging the entire length of an oversized collar, permitting use of the higher strength materials in the collar.

The leading face 60 of the collar 26 in its initial configuration is beveled as indicated in FIGS. 1 and 3, so that as the collar material is rotated radially inwardly, this beveled surface 60 will become flush with the face of the sheet 16. The collar 26 also includes a counterbore 62, as shown in FIG. 1 in its initial configuration which is to compensate for any pin, shank or sheet thickness variations.

With this particular fastening system, there is a very precise and accurate preload control. This control is regulated by the volume of the collar (26) material used and also by what is termed "a reference length" which is the length indicated as "L" in FIG. 3. This length is determined by the distance between the face of the sheet 16 and the lower or inner ridge of the first groove of the threaded portion 22 of the pin 10 that is filled with material of the collar 26, upon the initial axial movement of the sleeve 28. For any length L the preload can be computed as a direct fuction of this distance in relation to the outer surface slope angle of the collar, the length of this outer surface, and the volume of the collar material regardless of the grip length or tolerance of the pin itself. Additionally, the slope angle may determine some predictable initial preload and clamp up. Accordingly, the final preload and clamp-up on the system can be very precisely and accurately controlled and determined.

FIG. 5 shows an optional feature of this embodiment wherein the outer sleeve member 28 includes an outer surface comprised of wrenching means 64 to permit the set fastener system to be torqued off from a threaded pin 10.

Turning now to the embodiment shown by FIGS. 6 through 9, a pin member 70 and two-piece female member 72 are adapted to be clamped together to join sheets 74 and 76 in a preloaded clamped relationship, as with the first embodiment. The pin 70 includes a protruding head 78, a shank 80, and a grooved portion 82. In this case, the grooves are indicated as being annular in configuration; however, they may be any form of slot or groove, or may be threaded. The pin 70 is adapted to fit within mating holes 84 and 86 in sheets 74 and 76 with the head 78 of the pin 70 being positioned abutting the outer surface of the sheet 74, and with the grooved portion 82 extending outwardly of the sheets opposite the head 78. The female member 72 includes a malleable ductile collar member 96 and an outer sleeve member 98 of relatively stronger material with greater modulus (and at least somewhat less ductility) than the collar 96. As with the prior embodiment, preferably the sleeve and the collar are formed separately and are press fit together initially at surface 100 of the collar 96 (FIG. 6) prior to the setting of the fastener system. FIG. 7 indicates that the collar 96 includes axial relief slots 102 as with the collar in the prior embodiment. The collar 96 also includes a conically tapered inclined section 104 (FIG. 6) and a counterbore 112 as with the prior collar 26. However, in this embodiment, because the sleeve 98 is of relatively stronger material with greater modulus than the collar 96, no lubricant is necessary between the relative sliding surfaces of these members, although a lubricant if provided would assist in such relative movement.

In assemblying this system, the pin 70 has been inserted in the mating holes of the sheets, the collar 96 is positioned adjacent the sheet 76 and about the grooved portion 82 of the pin 70. An anvil tool member 108 is then positioned, as in the previous embodiment, abutting the outer end of the sleeve 98. The anvil tool 108 provides an axial force on the sleeve 98 toward the sheets and this force is resisted by a bucking bar 110 (FIG. 8), which is positioned abutting the head 78 of the pin 70. Again, the anvil tool is primarily passive and provides at its cylindrical surface 109 only confinement for the sleeve 98, while the sleeve 98 itself does the actual swaging.

As with the prior embodiment, as the axial force is applied by the anvil tool 108 to the sleeve 98, the sleeve 98 moves axially along the collar 96 toward the sheets, rotating the frusto conical surface of the collar radially inwardly and swaging the collar material about the annular grooves 82 of the pin 70. Again, as the sleeve 98 moves toward the sheet 76, the forces acting upon the collar 96 produce axial forces both in the direction of the sheets for clamping the sheets together and axially outwardly from the sheets to create a preload on the pin 70.

As with the prior embodiment, the inward edge of the collar 96 is beveled at 114 so that as the collar is bent inwardly this face 114 will become flush with the face of the sheet 76. Additionally, the sleeve 98 also includes an annular shoulder portion 118 at its outer end which extends inwardly to effectively swage all of the material of the collar 96 about the grooves 82 as in the prior embodiment. The sleeve 98 may also include a beveled portion 99 over which material of the collar 96 is forced by the tool 108 to lock the sleeve 98 to the collar 96 in the set position.

When the anvil tool 108 and bucking bar 110 are removed, the sleeve 98 remains to effectively retain the swaged collar 96 in its set position to maintain the full and complete preload and clamp-up on the system, since, as before, the sleeve 98 has not been substantially deformed or swaged, and additionally in this embodiment the sleeve 98 is of relatively stronger material than the collar 96, and therefore resists the dilation or return of the material of the collar 96 to its original configuration. As with the prior embodiment, the preload and clamp-up on the system can be precisely and accurately controlled in the same manner by controlling the volume of the material of the collar 96, the angle of the inclined section 104, the length of the inclined section 104, and by the reference length "L" as determined by the lower or inner ridge adjacent the first groove of the pin 70 which is filled with the material of the collar 96, as indicated in FIG. 8.

The fastening system disclosed herein, accordingly, provides an effective and accurately predetermined preloaded system for clamping two or more sheets together. An outer sleeve element of the female member of the fastening system is employed to swage an inner element of the female member about a grooved portion of a pin positioned within mating holes in the sheets. This outer sleeve element, which performs the swaging operation, is retained in the set fastened position after the tool has been removed to effectively maintain the full preload applied on the system.

I claim:

1. A fastening system for joining two or more adjacent sheets together, the sheets having mating holes, said system comprising:

a pin having a head and a shank, said head being positionable adjacent one of the sheets, said shank being positionable within the mating holes and including a grooved portion extending from the sheets opposite said head;

a malleable inner collar member including a first portion and a second portion, the first and second portions being joined together, the first portion having a smaller outer transverse dimension than that of the second portion; the collar member being positionable about the grooved portion of said pin so that the second portion of said collar member is disposed nearer the head of the pin than the first portion; and an outer sleeve member of material no more malleable than said collar member, said sleeve member defining an opening for receiving the first portion of said collar member, and having an inner transverse dimension smaller than the outer transverse dimension of the second portion of said collar member, said sleeve member being movable axially along said collar member in the direction from the first portion of the collar member toward the head of the pin upon the application of an axial force applied to said sleeve member, to swage said collar member radially inwardly about said grooved portion of said pin, so as to create an axially outward force on the grooved portion of said pin to provide thereby preload on the sheets, said sleeve member being adapted to retain said collar member about said pin after said axial force has been removed.

2. The fastening system of claim 1 wherein the preload applied to said system is controlled by the volume of the collar member.

3. The fastening system of claim 1 wherein the preload applied to said system is a function of the distance between the sheets and a reference point on said collar member, said reference point being the inward ridge adjacent the first groove of the pin to receive swaged material of said collar member upon the initial axial movement of said sleeve member.

4. The fastening system of claim 1 wherein said sleeve member is positioned about said first portion of said collar member prior to the application of the axial force.

5. The fastening system of claim 1 wherein said second portion of said collar member is deformed about a portion of the outer end of said sleeve member to lock said collar and sleeve members together.

6. The fastening system of claim 1 wherein said collar member includes at least two relief slots extending from its inward end axially toward the outer end thereof for a portion of the axial length of said collar member.

7. The fastening system of claim 1 wherein said collar member includes an outer surface which is frusto conical in shape and slopes outwardly toward the end of said second portion of said collar member adjacent said sheets.

8. The fastening system of claim 1 wherein said sleeve member includes wrenching means on the outer surface thereof.

9. The fastening system of claim 1 wherein said sleeve member includes an inwardly protruding annular shoulder portion adjacent its outer end.

10. The fastening system of claim 1 wherein said collar member includes a counterbore at its inner end.

11. The fastening system of claim 1 wherein said sleeve member is of relatively stronger material than said collar member.

12. The fastening system of claim 1 wherein a substantial portion of the outer surface of said collar member is coated with a lubricant prior to the application of the axial force to the sleeve.

13. The fastening system of claim 1 wherein the interior surface of said sleeve member is cylindrical and a substantial portion of said interior surface is coated with a lubricant prior to the application of the axial force to said sleeve.

* * * * *